(12) United States Patent
Deardurff et al.

(10) Patent No.: US 6,869,646 B2
(45) Date of Patent: Mar. 22, 2005

(54) FAST DRYING IMAGES AND METHODS FOR PRINTING ON INORGANIC POROUS MEDIA

(75) Inventors: Larrie A Deardurff, Corvallis, OR (US); Bor-Jiunn Niu, San Diego, CA (US); Gary W Byers, Vista, CA (US)

(73) Assignee: Hewlett-Packard Company, L.P., Houston, TX (US)

( * ) Notice: Subject to any disclaimer, the term of this patent is extended or adjusted under 35 U.S.C. 154(b) by 8 days.

(21) Appl. No.: 09/923,672

(22) Filed: Aug. 6, 2001

(65) Prior Publication Data

US 2003/0064202 A1 Apr. 3, 2003

(51) Int. Cl.$^7$ ............................................. B41M 5/40
(52) U.S. Cl. ............................. 428/32.17; 428/304.4; 428/323; 106/31.48; 106/31.57
(58) Field of Search ............................. 428/32.17, 304.4, 428/323, 195; 106/31.48, 31.57

(56) References Cited

U.S. PATENT DOCUMENTS

| | | | | | |
|---|---|---|---|---|---|
| 4,299,630 A | * | 11/1981 | Hwang | .................. | 106/22 |
| 4,388,115 A | * | 6/1983 | Sugiyama et al. | ............ | 106/22 |
| 4,512,807 A | * | 4/1985 | Ogawa et al. | ................. | 106/22 |
| 5,183,501 A | * | 2/1993 | Kawashita et al. | ....... | 106/22 D |
| 5,605,750 A | * | 2/1997 | Romano et al. | ......... | 428/304.4 |
| 5,670,249 A | * | 9/1997 | Tanuma | .................... | 428/304.4 |
| 5,723,211 A | * | 3/1998 | Romano et al. | ............. | 428/328 |
| 5,789,070 A | * | 8/1998 | Shaw-Klein et al. | ......... | 428/216 |
| 5,858,075 A | * | 1/1999 | Deardurff et al. | ......... | 106/31.27 |
| 5,948,154 A | * | 9/1999 | Hayashi et al. | ........... | 106/31.48 |
| 5,972,084 A | * | 10/1999 | Lacroix et al. | ........... | 106/31.36 |
| 5,972,087 A | * | 10/1999 | Uraki et al. | .............. | 106/31.65 |
| 5,980,622 A | | 11/1999 | Byers | ........................ | 106/31.48 |
| 5,997,622 A | * | 12/1999 | Weber et al. | ............. | 106/31.48 |
| 6,001,161 A | * | 12/1999 | Evans et al. | .............. | 106/31.48 |
| 6,436,178 B1 | * | 8/2002 | Hosmer | .................... | 106/31.46 |

FOREIGN PATENT DOCUMENTS

| | | | | |
|---|---|---|---|---|
| EP | 0 813 978 A1 | * | 12/1997 | ............ B41M/5/00 |
| EP | 0902064 A1 | | 3/1999 | |
| EP | 1081198 A2 | | 3/2001 | |

OTHER PUBLICATIONS

"The Reproduction of Color" by R.W.G. Hunt, Chapter 8, pp. 136–176; Fountain Press, England.

* cited by examiner

*Primary Examiner*—B. Shewareged

(57) ABSTRACT

The present method is drawn to the creation of fast-drying, photo-quality images with an ink-jet inks. The method comprises the steps of providing a inorganic porous media substrate, providing an aqueous ink-jet ink comprising an ink vehicle and an effective amount of a metallized dye having at least one heterocyclic nitrogen ring and an azo bond wherein the heterocyclic nitrogen is chelated or complexed to a transition metal, and jetting the aqueous ink-jet ink onto the inorganic porous media substrate.

7 Claims, No Drawings

FAST DRYING IMAGES AND METHODS FOR PRINTING ON INORGANIC POROUS MEDIA

FIELD OF THE INVENTION

The present invention is drawn to methods for providing photo-glossy images and photo quality images on a substrate, particularly on inorganic porous substrates.

BACKGROUND OF THE INVENTION

In recent years, computer printer technology has evolved to a point where very high-resolution images can be transferred to various media. One particular type of printing involves the placement of small drops of a fluid ink onto a surface in response to a digital signal. Typically, the fluid ink is placed or jetted onto the surface without physical contact between the printing device and the surface. The method that the ink is deposited onto the printing surface varies from system to system. However, two major systems include continuous ink deposit and drop-on-demand ink deposit.

With regard to continuous printing systems, inks used are typically based on solvents such as methyl ethyl ketone and ethanol. Essentially, continuous printing systems function as stream ink droplets are ejected and directed by printer nozzle. The ink droplets are directed additionally with the assistance of an electrostatic charging device in close proximity to the nozzle. If the ink is not used on the desired printing surface, the ink is recycled for later use. With regard to drop-on-demand printing systems, the ink-jet inks are typically based upon water and glycols. Essentially, with these systems, ink droplets are propelled from a nozzle by heat or by a pressure wave. Additionally, all of the ink droplets are used to form the printed image and are ejected when needed.

There are several reasons that ink-jet printing has become a popular way of recording images on various media, particularly paper. Some of these reasons include low noise, capability of high speed recording, and multi-color recording. Additionally, these advantages can be obtained at a relatively low price to consumers. However, though there has been great improvement in ink-jet printing, accompanying this improvement are increased demands on ink-jet printing, e.g., higher speed, higher resolution, full color image formation, etc.

There are several characteristics to consider when evaluating a printer ink in conjunction with a printing surface or substrate. Such characteristics include (a) edge acuity and optical density of the image on the surface, (b) dry time of the ink on the substrate, (c) adhesion to the substrate, (d) lack of deviation of ink droplets, (e) presence of all dots, (f) resistance of the ink after drying to water and other solvents, (g) long-term storage stability, and (h) long-term reliability without corrosion or nozzle clogging. Though the above list of characteristics provides a worthy goal to achieve, there are difficulties associated with satisfying all of the above characteristics. Often, the inclusion of an ink component meant to satisfy one of the above characteristics can prevent another characteristic from being met. Thus, most commercial inks for use in ink-jet printers represent a compromise in an attempt to achieve at least an adequate response in meeting all of the above listed requirements.

Papers used for ink-jet printing have typically included high-quality or wood-free papers designed to have a high ink absorptivity. These papers are functionally good for ink-jet printing because the ink-jet inks may be absorbed readily and dry quickly. However, such papers often do not allow for a crisp or sharp image.

In order to attain enhanced print quality and image quality as in a photograph, special media has been developed to work with aqueous inks. For example, various coated papers (art paper, coat paper, cast-coat paper, etc.) have been prepared by coating a layer comprising a hydrophilic binder and an inorganic pigment on a paper substrate. Additionally, recording sheets have been prepared by coating an ink absorptive layer on paper or other supports, e.g., transparent or opaque plastic film supports. An example of such specialty media utilizes a swelling-type ink absorptive layer, e.g., gelatin. Though swellable media provides a relatively good substrate with respect to certain image quality properties, a drawback includes the fact that swellable media requires longer dry-time than other types of media. Additionally, with some inks, swellable media performance is less than desirable with respect to humid hue shift and humid bleed. Because of these limitations, it has been recognized that it would be advantageous to develop methods for providing fast drying, high quality images that exhibit only minimal humid hue shift and humid bleed.

SUMMARY OF THE INVENTION

The present invention is drawn toward photo-quality images on porous media substrates as well as methods for creating photo-quality images on porous media substrates. Though the present invention is particularly useful when certain magenta dyes are used alone in an in ink-jet ink formulation, other dyes can also be present, creating ink-jet ink colors other than those of straight magentas.

Thus, a method of creating a fast-drying, photo-quality image is disclosed comprising the steps of providing an inorganic porous media substrate, providing an aqueous ink-jet ink comprising a metallized dye having at least one heterocyclic nitrogen ring and an azo bond wherein the heterocyclic nitrogen is chelated or complexed to a transition metal, and jetting the aqueous ink-jet ink onto the inorganic porous media substrate in the form of a predetermined image.

Additionally, a photo-quality image on a substrate is disclosed comprising a porous media substrate, and an image on the substrate provided by an aqueous ink-jet ink comprising an ink vehicle and a metallized dye having a heterocyclic nitrogen and an azo bond wherein the heterocyclic nitrogen is chelated or complexed to a transition metal.

With respect to either the methods or images of the present invention, the metal can also be chelated or complexed to a nitrogen of the azo bond and/or a group bonded to the heterocyclic nitrogen ring through the azo bond, e.g., a naphthalene group or quinolinol group. Additional features and advantages of the invention will be apparent from the detailed description which follows, taken in conjunction with the accompanying examples.

DETAILED DESCRIPTION OF THE INVENTION

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

It must be noted that, as used in this specification and the appended claims, the singular forms "a," "an," and "the" include plural referents unless the content clearly dictates otherwise.

As used herein, "effective amount" refers to the minimal amount of a substance or agent, which is sufficient to achieve a desire effect. For example, an effective amount of an "ink vehicle" is the minimum amount required in order to create ink, which will meet functional performance and characteristic standards.

As used herein, "ink vehicle," refers to a vehicle in which the dyes used in accordance with the present invention are incorporated in the form of an ink-jet ink. Ink vehicles are well known in the art, and a wide variety of ink vehicles may be used with the ink composition of the present invention. Such ink vehicles may include a mixture of a variety of different agents, including without limitation, surfactants, solvents, co-solvents, buffers, biocides, viscosity modifiers, surface-active agents, and water.

"Porous media" refers to any substantially inorganic media having voids and/or cavities capable of taking in the ink-jet inks of the present invention. As ink is printed on the porous media, the ink can fill the voids and the outermost surface can become dry to the touch in a more expedited manner as compared to traditional or swellable media.

"Chroma" refers to the brightness exhibited by the ink-jet ink once printed on the substrate. See, R. W. G. Hunt, *The Reproduction of Colour*, 5$^{th}$ Ed., Chap. 7.

"Light fastness" refers to the ability of the ink-jet ink to retain its chroma and/or optical density as well as other hue properties over time.

With these definitions in mind, the invention relates to the compositions and methods for printing high quality images using of a family of inks that perform well on porous media, including porous silica media. The ink-jet inks of preference comprise the presence of metallized dyes having heterocyclic nitrogens and azo bonds. In the metallized dyes, the heterocyclic nitrogens act to complex or chelate a transition metal. Desired metals for use with these dyes include nickel, copper, iron, or cobalt, as well as other transition metals.

Specifically, a method for creating a fast-drying, photo-quality image with an ink-jet ink is disclosed comprising the steps of providing a inorganic porous media substrate; providing an aqueous ink-jet ink comprising a metallized dye having at least one heterocyclic nitrogen ring and a azo bond wherein the heterocyclic nitrogen is chelated or complexed to a transition metal; and jetting the aqueous ink-jet ink onto the inorganic porous media substrate.

Additionally, a photo-quality image on a substrate is disclosed comprising a silica substrate and an image on the substrate, wherein the image provided by an aqueous ink-jet ink comprises an ink vehicle and a metallized dye having a heterocyclic nitrogen and a azo bond wherein the heterocyclic nitrogen is chelated or complexed to a transition metal.

With respect to both the compositions and methods described above, in one embodiment, the metallized dyes comprise a pyridine group bonded to a quinolinol group through an azo bond. Such a metallized dye can be in a dicarboxalate form. In another embodiment, the metallized dye can comprise a pyridine group bonded to a napthalene group through an azo bond. No matter what configuration the dye is in, in addition to chelation or complexation to the heterocyclic nitrogen, the metal can also be chelated or complexed to a nitrogen of the azo bond and/or a group bonded to the heterocyclic nitrogen ring through the azo bond, e.g., a naphthalene group or quinolinol group. No matter what dye is used, the dye can be present in the ink-jet ink in any functional amount. In one embodiment, the range can be from 0.1% to 10% by weight.

With respect to the porous media, any substrate containing or having coated thereon an inorganic porous material can be used. For example, a porous silica or porous alumina coated paper can be used. With such paper or media, the pore size can range from about 5 to 30 nanometers in width.

The pores are typically in place as part of a void-type ink absorptive layer. The voids act to take in the ink-jet ink, thus simulating the absorptive properties of a swellable substrate, without having the disadvantages associated with that media. For example, after printing on a void type media, the ink is drawn away from the surface making the substrate dry to the touch almost immediately. Thus, as compared to swellable media, image beading is reduced in high ink density areas. Additionally, image degradation in the high-density areas is also small. Such void type substrates can include, for example, papers or plastics coated with an inorganic material, such as silica or alumina. Optionally, a polymer binder can be present as well, though the polymer is not present for the purpose of creating the porous substrate.

By utilizing the formulations disclosed herein on inorganic porous media, such as silica or alumina media, the retention of light fade resistance can be realized. Additionally, in accordance with the present invention, humid hue shift and humid bleed can be reduced. With humid hue shift, the color properties can shift on an image over time if the prints are stored in humid conditions. With regard to humid bleed, in humid conditions, the border of the printed image can expand, diminishing any crispness of image present immediately after printing. Thus, by using the ink/porous media combination of the present invention, the printing of documents and images can be achieved that have good quality and excellent archivability.

Two classes of the preferred metallized dyes that are functional with the present invention include the use of metallized pyridylazoquinolinol (PAQ) dyes and metallized pyridylazonaphthol (PAN) dyes.

Representative Structures are Depicted Below in Formula 1 (PAQ) and Formula 2 (PAN):

Formula 1

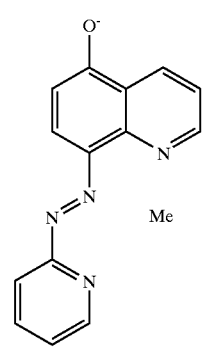

Formula 2

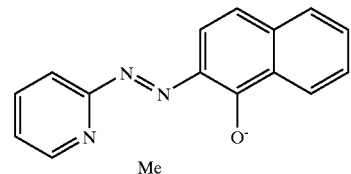

In Formulas 1 and 2 above, Me is a transition metal cation that is complexed or chelated to the heterocyclic nitrogen and/or the azo bond by means of ionic, coordinate covalent, or covalent bonding. Theses bonds are not specifically depicted in Formulas 1 or 2 because the exact nature of the bonding, e.g., covalent, ionic, π-bond, coordinate covalent, etc., between the electron rich ligand and the electrophilic transition metal cannot be drawn by conventional metal to ligand bonding lines. Additionally, any variations of structure to the ligand can be implemented in order to modify the functionality of the dye in accordance with the present invention. Particularly, U.S. Pat. Nos. 5,980,622 and 6,001,161, the entire teachings of which are incorporated by reference, disclose variations of Formulas 1 and 2 that would be functional with the present invention. For example, U.S. Pat. No. 6,001,161 teaches that any of the aromatic rings can be modified at appropriate sites by unsubstituted alkyl group of 1–6 carbon atoms, a substituted or unsubstituted aryl group of 6–10 carbon atoms, a substituted or unsubstituted heteroaryl group of 5–10 atoms, halogen, cyano, nitro, a substituted or unsubstituted alkoxycarbonyl group of 1–6 carbon atoms, a substituted or unsubstituted alkoxy group of 1–6 carbon atoms, hydroxy, a polyoxyalkylene group of 2–20 alkylene oxide residues, carboxy or a salt thereof, sulfo or a salt thereof, phospho or a salt thereof, carbamoyl, a substituted or unsubstituted alkyl-, aralkyl-, aryl-, diaryl- or dialkyl-carbamoyl group of 1–20 carbon atoms, sulfamoyl, a substituted or unsubstituted alkyl-, aralkyl-, aryl-, diaryl- or dialkyl-sulfamoyl group of 1–20 carbon atoms, acylamino, sulfonylamino, amino, a substituted or unsubstituted alkyl-, aralkyl-, aryl-, diaryl- or dialkyl-amino group of 1–20 carbon atoms or a quaternary ammonium or phosphonium group. Additionally, U.S. Pat. No. 5,980,622 teaches that one of the aromatic structures can be modified with $SO_3M$ wherein M is a positively charged moiety, or $SO_2NR_4R_5$ where $R_4$ and $R_5$ are independently selected from the group consisting of hydrogen and hydrophobic oil-solubilizing moieties, or $R_4$ is selected from the group consisting of hydrogen and hydrophilic water-solubilizing moieties and $R_5$ is selected from the group consisting of hydrophilic water solubilizing moieties.

Examples of specific pyridylazoquinolinol (PAQ) dyes and pyridylazonaphthol (PAN) dyes that can be used in accordance with the present invention, and which are within the scope of the skeletal structures shown in 5 Formulas 1 and 2, are shown in Formulas 3 to 8 as follows:

Formula 3

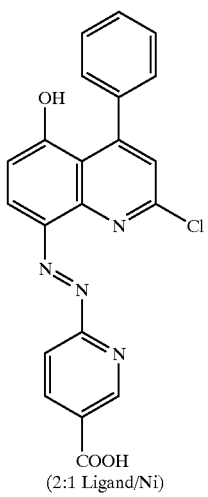

(2:1 Ligand/Ni)

Formula 4

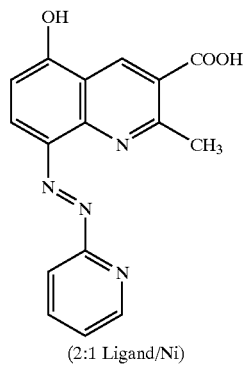

(2:1 Ligand/Ni)

Formula 5

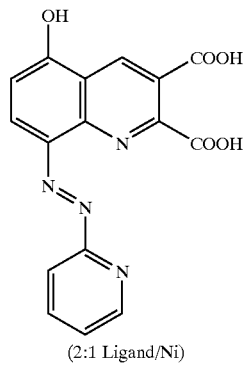

(2:1 Ligand/Ni)

Formula 6

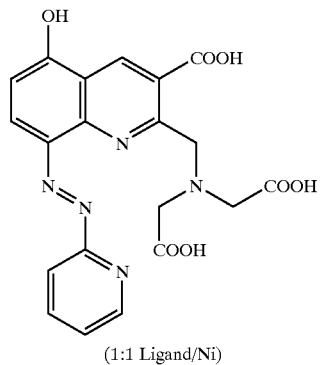

(1:1 Ligand/Ni)

Formula 7

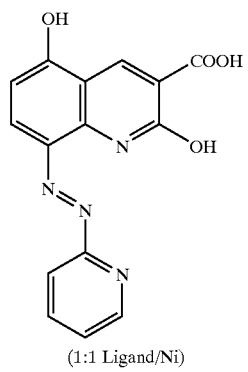

(1:1 Ligand/Ni)

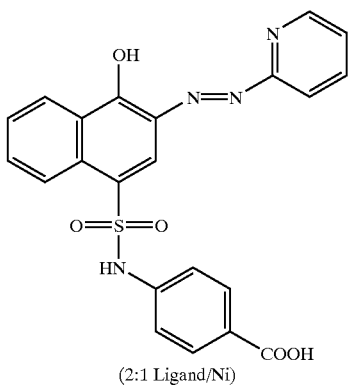

Formula 8

(2:1 Ligand/Ni)

Formulas 3 to 8 shown are the structures for the ligand only. The actual dye structure is a chelate or complex of the ligand and a transition metal, e.g., nickel(II) as shown in Formulas 3 to 8. However, nickel(II) is shown by way of example only. When using nickel(II) as the transition metal, the ratios shown are molar ratios, i.e., 1:1 Ligand/Ni and 2:1 Ligand/Ni. Further, with respect to PAQ/nickel(II) examples, it is believed that the nickel ion coordinates or complexes with three nitrogen atoms present on each ligand structure, i.e., one of the azo nitrogens, a pyridine nitrogen, and a quinolinol nitrogen (PAQ). With respect to the 1:1 ligand/Ni complexes, only one ligand is bound to the nickel ion. Thus, depending upon the presence of pendant coordinating moieties, there are up to 3 remaining coordination sites on the nickel (as nickel(II) has a potential coordination number of 6). These unbound coordination sites are most likely filled by water, or as in the case of Formula 6 PAQ, the nitrogen and the two carboxy groups on the side arm can bind to the nickel ion as well. With respect to the 2:1 ligand/Ni complexes, two molecules can be bound to the nickel ion. Thus, in most instances, all of the coordination sites of the nickel ion are satisfied by the ligands.

As a side note, on some occasions, in order to get the 2:1 dyes described above to dissolve, the pH can be raised to 11 with a basic pH adjuster such as 10% to 50% NaOH. After dissolving, the pH can be lowered to about 8 to 9 for the final ink product. An acidic pH adjuster can be used such as, for example, 0.1 to 1 N HCl.

EXAMPLES

The following examples illustrate the embodiments of the invention that are presently best known. However, other embodiments can be practiced that are also within the scope of the present invention.

Example 1

PAQ Dye-Based Ink-Jet Inks

Five pyridylazoquinolinol (PAQ) dye-based ink-jet inks were prepared. Each of the inks prepared contained, by weight, 10% 1,5 pentanediol, 5% 2-pyrolidone, 1.5% TERGITOL™ 15-S-7, 0.5% TERGITOL™ 15-S-5, 81.5% water, and 1.5% PAQ dye. Thus, the only difference between each of the five ink-jet inks was the PAQ dye selected for use. Specifically, the PAQ dyes used were those shown in Formulas 3, 4, 5, 6, and 7, each having a nickel(II) transition metal ion chelated or complexed thereto.

Example 2

PAN Dye-Based Ink-Jet Inks

Three pyridylazonaphthol (PAN) dye-based ink-jet inks were prepared. Each of the inks prepared contained, by weight, 10% 1,5 pentanediol, 5% 2-pyrolidone, 1.5% TERGITOL™ 15-S-7, 0.5% TERGITOL™ 15-S-5. The remaining two components were Formula 8 PAN and water. A first ink contained 81% water and 2% PAN dye. A second ink contained 82% water and 1% PAN dye. A third ink contained 82.5% water and 0.5% PAN dye. Each of the PAN dyes of the ink prepared were metallized with nickel(II) ions.

Example 3

Light Fastness Comparison

A light fastness or dye loss comparison was carried out using two of the above PAQ dye-based ink jet inks and three PAN dye based ink-jet inks. These dye-based ink-jet inks were compared to a commercially available magenta dye-based ink jet ink (Hewlett-Packard HP970C Magenta) after printing each on inorganic porous media (Hewlett-Packard Part No.: C6765A). The values listed in Table 1 represent the calculated time (years) for 25% dye loss to occur when exposed to app. 70 Klux Cool White fluorescent light in an Atlas HPUV fade chamber. The data was gathered under accelerated conditions, assuming that one year of typical indoor office exposure is 450 lux/12 hour day (1971 Klux-hr).

TABLE 1

| Dye-based ink-jet ink | Inorganic Porous Media (time in years) |
| --- | --- |
| HP970C Magenta | 1.9 |
| Ink containing 1.5% Formula 3 PAQ | 1.5 |
| Ink containing 1.5% Formula 5 PAQ | 2.0 |
| Ink containing 0.5% Formula 8 PAN | 3.9 |
| Ink containing 1.0% Formula 8 PAN | 4.0 |
| Ink containing 2.0% Formula 8 PAN | 4.5 |

As can be seen in Table 1, the light fastness for PAN dye-based ink-jet inks is improved compared to the standard magenta dye-based ink tested. The two specific PAQ dye-based ink-jet inks tested were shown to be comparable to the HP970C dye based ink with respect to light fastness.

Example 4

Humid Bleed and Humid Hue Shift Comparison

Two dye-based ink jet inks described in Example 1 (1.5% Formula 3 PAQ and 1.5% Formula 5 PAQ, each by weight) and three dye-based ink-jet inks described in Example 2 (0.5% Formula 8 PAN, 1.0% Formula 8 PAN, and 2.0% Formula 8 PAN, each by weight) were compared against HP970C magenta ink for humid bleed and humid hue shift. Both an inorganic porous media (Hewlett-Packard Part No.: C6765A) and a swellable media (Hewlett-Packard Part No.: C6831A) were used in the comparison.

Humid bleed and humid hue shift tests were carried out as the inks described were printed at a line thickness of about 40 mils on both the porous media paper and the swellable media paper. The papers were placed in a 35° C. and 80% relative humidity environment for four days.

The data related to humid bleed is shown below in Table 2 (the data provided for each paper substrate shows the increase in line width after being subjected the conditions described above in this example):

TABLE 2 humid bleed data

| Dye-based ink-jet ink | Swellable Med. (mils) | Porous Med. (mils) |
|---|---|---|
| HP970C Magenta | 10.1 | 3.6 |
| Ink containing 1.5% Formula 3 PAQ | 1.4 | 0.0 |
| Ink containing 1.5% Formula 5 PAQ | 0.3 | 1.4 |
| Ink containing 0.5% Formula 8 PAN | 0.3 | 0.0 |
| Ink containing 1.0% Formula 8 PAN | 0.3 | 0.3 |
| Ink containing 2.0% Formula 8 PAN | 0.4 | 0.1 |

As can be seen, generally, with the exception of Formula 5 PAQ, the inorganic porous media performed as well as or better than the swellable media with respect to humid bleed and in all instances, the PAQ and PAN dyes out-performed the HP970 magenta dye.

Humid hue shift was also measured utilizing the $L^*$, $a^*$, $b^*$ coordinate system. See, R. W. G. Hunt, *The Reproduction of Colour*, $5^{th}$ Ed, Chap. 7. This system represents one method for quantifying brightness, hue, or chroma as vectors in color space. The magnitude of each chroma vector represents the brightness or strength of color. White and black have no chroma. The data of Table 3 below was provided by following the outlined procedure. First, initial $L^*$, $a^*$, and $b^*$ readings were measured with respect to each step of a 10 step-wedge optical density ramp (from 0% to 100%) on both the porous paper and swellable paper. After spending four days under the conditions specified previously in this Example, final readings were measured. The difference between the initial readings and the final readings, $\Delta E$, were calculated using formula 9 below:

$$\Delta E = [(L^*_i - L^*_f)^2 + (a^*_i - a^*_f)^2 + (b^*_i - b^*_f)^2]^{1/2} \quad \text{Formula 9}$$

In the above formula "i" is the initial reading and "f" is the final reading. The data related to humid hue shift is shown below in Table 3:

TABLE 3 humid hue shift

| Dye-based ink-jet ink | Swellable Med. ($\Delta E$) | Porous Med. ($\Delta E$) |
|---|---|---|
| HP970C Magenta | 17.9 | 12.6 |
| Ink containing 1.5% Formula 3 PAQ | 21.5 | 13.2 |
| Ink containing 1.5% Formula 5 PAQ | 1.7 | 8.1 |
| Ink containing 0.5% Formula 8 PAN | 1.7 | 1.9 |
| Ink containing 1.0% Formula 8 PAN | 3.1 | 3.5 |
| Ink containing 2.0% Formula 8 PAN | 10.7 | 7.4 |

As can be seen, generally, the inorganic porous media was comparable to the swellable media in most circumstances, and in some cases, was better. Additionally, the PAQ and PAN dyes, in most instances, out-performed the HP970C magenta on porous media.

While the invention has been described with reference to certain preferred embodiments, those skilled in the art will appreciate that various modifications, changes, omissions, and substitutions can be made without departing from the spirit of the invention. It is therefore intended that the invention be limited only by the scope of the appended claims.

What is claimed is:

1. A photo-quality image on a substrate comprising:
   (a) a porous media substrate; and
   (b) an image on the substrate provided by an aqueous ink-jet ink comprising an ink vehicle, and a nickel metallized dye having a ligand to nickel molar ratio of 2:1, wherein said ligand has the structure:

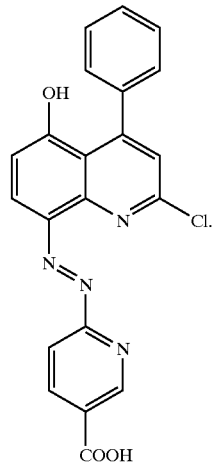

2. A photo-quality image on a substrate as in claim 1, wherein the aqueous ink-jet ink is prepared by raising the pH of the ink with a pH adjuster to dissolve the nickel metallized dye, followed by lowering the pH to form the final ink product.

3. A photo-quality image on a substrate comprising:
   (a) a porous media substrate; and
   (b) an image on the substrate provided by an aqueous ink-jet ink comprising an ink vehicle, and a nickel metallized dye having a ligand to nickel molar ratio of 1:1, wherein said ligand has the structure:

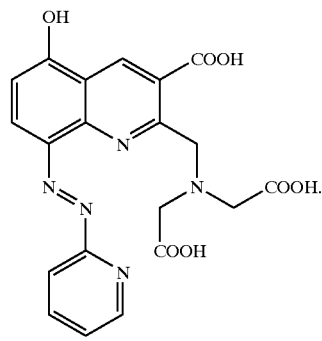

4. A photo-quality image on a substrate as in claim 3, wherein the nitrogen and the two carboxyl groups of the quinolinol group are bound to the nickel, satisfying the coordination number of the nickel.

5. A photo-quality image on a substrate comprising:
   (a) a porous media substrate; and
   (b) an image on the substrate provided by an aqueous ink-jet ink comprising an ink vehicle, and a nickel metallized dye having a ligand to nickel molar ratio of 1:1, wherein said ligand has the structure:

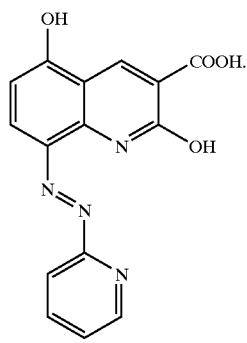

6. A photo-quality image on a substrate comprising:
(a) a porous media substrate; and
(b) an image on the substrate provided by an aqueous ink-jet ink comprising an ink vehicle, and a nickel metallized dye having a ligand to nickel molar ratio of 2:1, wherein said ligand has the structure:

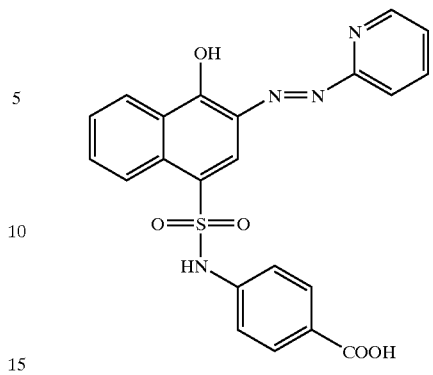

7. A photo-quality image on a substrate as in claim 6, wherein the ink-jet ink includes a small amount of a pyridine solvent to improve the solubility of the nickel metallized dye in the ink-jet ink.

* * * * *